April 3, 1956 F. L. MOORE ET AL 2,740,633

RECORDING APPARATUS

Filed Jan. 17, 1950 2 Sheets-Sheet 1

INVENTORS

Frank L. Moore and
Willard A. Roberts

BY Raymond W. Colton

ATTORNEY

April 3, 1956 F. L. MOORE ET AL 2,740,633

RECORDING APPARATUS

Filed Jan. 17, 1950 2 Sheets-Sheet 2

INVENTORS
Frank L. Moore and
Willard A. Roberts

BY Raymond W. Colton
ATTORNEY

United States Patent Office 2,740,633
Patented Apr. 3, 1956

2,740,633

RECORDING APPARATUS

Frank Lester Moore, Newington, and Willard A. Roberts, Wethersfield, Conn., assignors to The Gray Manufacturing Company, a corporation of Connecticut Application January 17, 1950, Serial No. 139,038

11 Claims. (Cl. 274—12)

This invention relates to recording apparatus, and particularly to the compensation for variations in the recording media used with such apparatus.

Record grooves should be of substantially constant depth to assure proper tracking and generally satisfactory reproduction. To achieve uniform groove depth with a fixed recording head, it is necessary that a support for the record medium be movable relative to the head to compensate for variations in the thickness of the medium and for the effects of temperature upon the physical characteristics of the medium.

The present invention concerns itself with recording apparatus wherein an embossing stylus operates upon plastic media to produce a groove of substantially constant depth, despite the usual thickness and temperature variations encountered in normal use.

The apparatus comprises a frame, a stylus carried by the frame for engagement with one surface of a record, the stylus having a transverse axis of movement fixed relative to the frame during a recording operation, record abutting or support means for engagement with the opposite surface of the record carried by the frame in movable relationship with respect to the stylus, stop means secured to the frame limiting movement of the abutting or support means towards the stylus, and driving means for advancing a record between the stylus and abutting or support means in a forward direction, the abutting or support means defining a gap opposite the stylus, the gap extending substantially normally to the forward direction.

The abutting or support means preferably comprises a pair of spaced members or supports, and spaced coaxial rollers have been utilized for the purpose in the illustrated embodiment. The supports may have an axis lying in a vertical plane common to the stylus, but adjustability of the supports in the path of the record medium is contemplated for regulation of the effective angle of the stylus relative to the medium. The supports are also adjustable in their degree of approach to the stylus, and biasing means urging the supports towards the stylus is also rendered adjustable.

The driving means preferably imparts an arcuate path to the sound record or medium, in which case the gap defined by the supports extends radially of the path. Such movement of the medium over rotary rollers defining the supports, results in a minimum of frictional drag and its adverse effects. The record supports are preferably carried by a lever pivotally carried in the frame, and a spring applied to the lever and frame biases the supports towards the stylus. Whereas the supporting rollers preferably have cylindrical portions to support the record medium, at least one of them is preferably tapered to define a convergent portion adjacent to and coaxial with the cylindrical portion to facilitate introduction of the medium to its proper position between the support and stylus.

A more complete understanding of the invention will follow a description of the accompanying drawings wherein.

Figure 1:
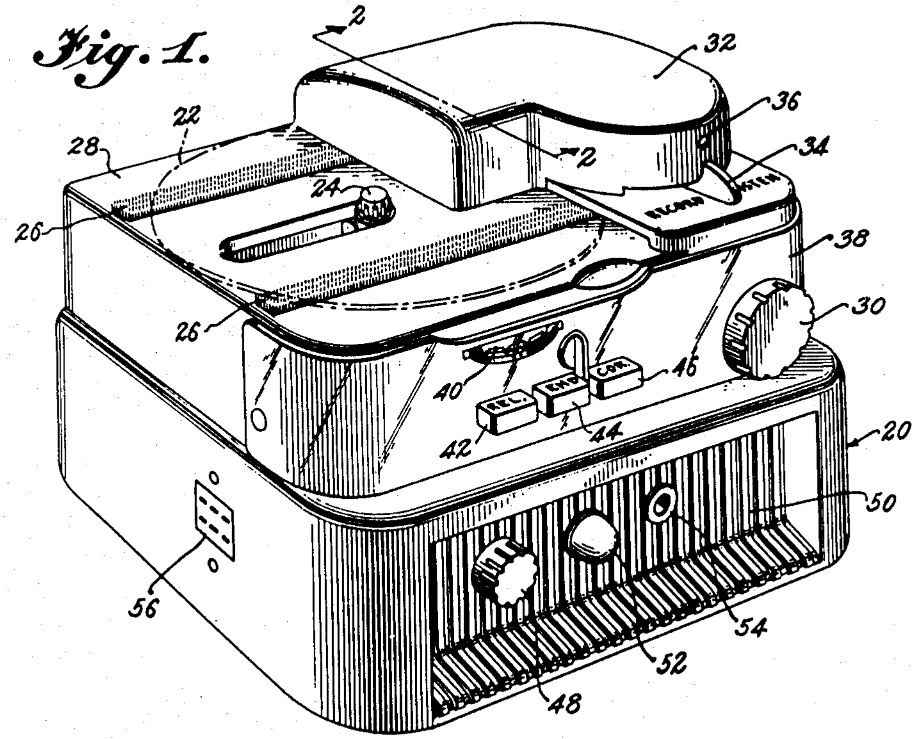
Fig. 1 is a perspective view of recording-reproducing apparatus incorporating the invention.

The recorder-reproducer 20, as shown in Fig. 1, receives a disc record 22 on its record driving spindle 24, the record being supported upon plush strips 26 carried by the table 28. The position of the driving spindle and its carriage with respect to the table is adjustable under the control of a knob 30. The recording and reproducing styli arranged beneath the cover member 32 are selectively advanced for contact with the record by means of a lever 34, whose position will be indicated through a small jewel 36 set in the cover member.

An index strip, not shown, is received behind the plastic guide 38 and driven by a sprocket 40 suitably coupled with the record carriage. The sprocket can be retracted by depression of the release button 42, a pair of punches being actuated by the depression of buttons 44 and 46 to indicate the end of an item of dictation or a correction to be made therein, respectively. A power switch and volume are controlled by a knob 48, mounted on a panel 50 which also receives a volume indicator lamp 52 and an output jack 54. A multiple socket 56 carries a plurality of terminals for cooperation with plug terminals connected with a microphone and control switches, not shown.

Figure 2:
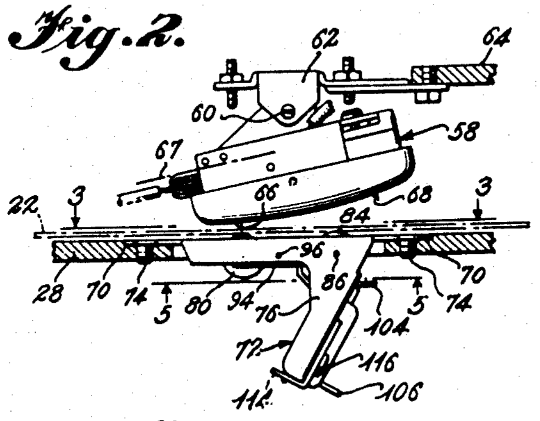
Fig. 2 is a fragmentary elevation, partially in section, taken along line 2—2 of Fig. 1.
Figure 4:
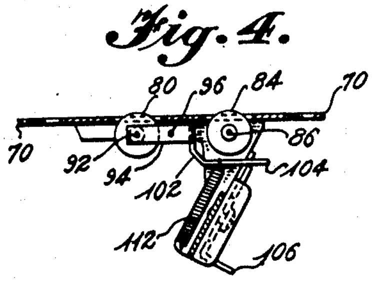
Fig. 4 is a sectional elevation taken along line 4—4 of Fig. 3.

The recorder-reproducer head 58 is mounted on a pivot 60 carried by a bracket 62 secured to the frame 64. In Fig. 2, the head 58 is depicted with its recording stylus 66 in engagement with the record medium 22, the reproducing stylus 68 being elevated to an inoperative position. The recording stylus 66 has a transverse axis 67 about which it moves to modulate a record, this axis being fixed relative to the frame during a recording operation. A typical example of such an arrangement is disclosed in the patent to Moore, 2,563,860, dated August 14, 1951. The table 28 also carried by the frame 64, is stepped to receive the flanges 70 of a compensator 72 secured thereto by means of screws 74. Once the compensator is thus secured to the table, its frame 76 becomes rigid with the frame 64 of the machine.

The upper surface of the compensator 72 is provided with an opening 78 through which a pair of rollers 80 project for contact with the undersurface of the record medium 22 during a recording operation, and an opening 82 through and beyond which a roller 84 projects for contact with the undersurface of a record medium 22 during a reproducing operation. The roller 84 is carried by a shaft 86 journaled in the side walls 88 of the compensator frame, and suitably spaced with respect thereto by means of suitable collars 90 interposed between the roller and the side flanges or walls 88. The rollers 80 for cooperation with the recording stylus 66, are supported on a shaft 92 whose ends are carried by a yoke 94 which is movably supported for pivotal movement by a shaft 96 which is also journaled in the side walls 88 of the compensator frame. A spacing collar 98 is carried by the shaft 96 between one of the walls 88 and the yoke, and a biasing spring 100 is carried by the shaft 96 interposed between the other of the walls 88 and the yoke 94. The yoke is provided with an operating arm 102 which projects outwardly beyond the compensator frame to provide an end 104 which cooperates with an adjusting slide 106 which can be secured in any of its adjusted positions by means of a screw 108 which is threaded into the frame. The projecting end of the operating arm 102 rests upon the upper edge 110 of the adjusting slide 106 when the rollers 80 are in their uppermost position. A spring 112 connected with the operating arm 102 at one end and with an adjusting slide 114 at its other end, biases the rollers 80 towards their uppermost position, the tension of the spring 112 being adjusted by movement of the slide 114 which is held in any of its adjusted positions by means of a screw 116 threaded into the compensator frame. Each of the slides 106 and 114 contains a slot 118 to receive its corresponding locking screw and permit movement of the slides with respect to the frame. The lower ends of both slides are bent at right angles to the remaining portions thereof, these lower portions containing small openings 120, the opening thus formed in the slide 114 receiving the lower end of the spring 112.

Figure 3:
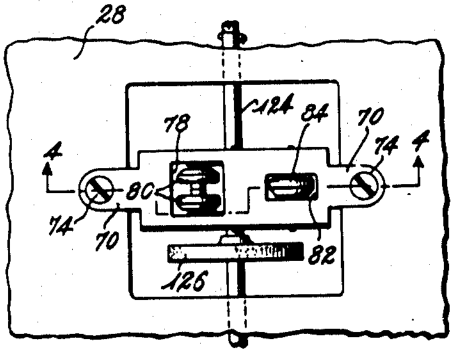
Fig. 3 is a plan view taken along line 3—3 of Fig. 2.
Figure 5:
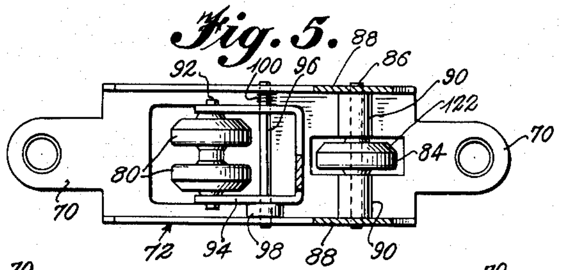
Fig. 5 is a bottom plan view, partially in section, taken along line 5—5 of Fig. 2.
Figures 6, 7:
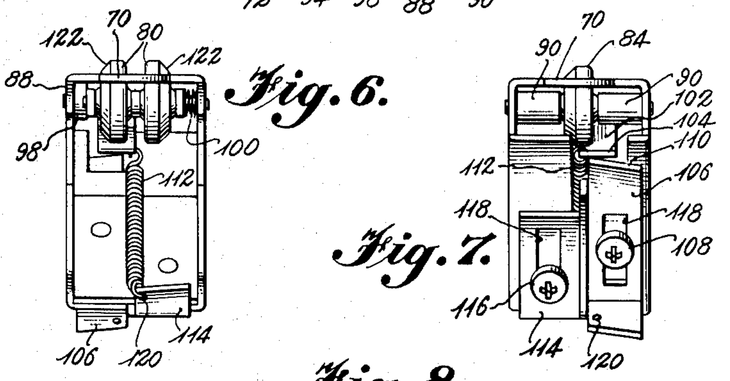
Fig. 6 is an end elevation looking from the left end of Fig. 5.
Fig. 7 is an end elevation looking from the right end of Fig. 5.
Figure 8:
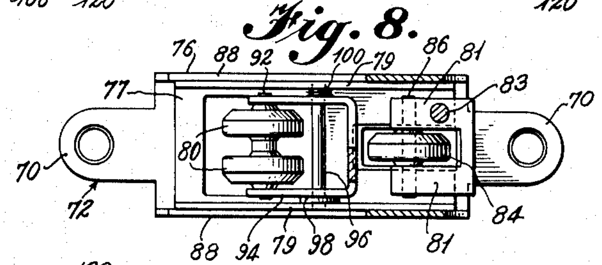
Fig. 8 is a plan view, corresponding to Fig. 5 of a modification.

It will be noted in the case of each of the rollers 80 and 84, that the surface for contact with the record medium is cylindrical, one end terminating in a tapered surface formed adjacent thereto and coaxial therewith to facilitate introduction of the record between the rollers and their styli, the other end terminating in a slightly rounded corner to avoid damage to the record medium. These tapered surfaces 122 are directed towards the left of the machine as viewed in Fig. 1 in the case of the reproducing roller 84 and in the case of one of the recording rollers 80, namely that roller which is first engaged by the edge of a record being introduced into the machine. The control lever 34 not only selects the stylus to engage the record, but also initiates and terminates the record drive through a driving shaft 124 carrying a friction roll 126 for engagement with the underside of the record when a pressure roll, not shown in Fig. 3, engages the upper surface of the record under the influence of the control lever 34.

The gap defined between the pair of rollers 80 will register with the recording stylus 66 on opposite sides of the record medium 22. This will permit the material composing the record to behave like a beam under the effects of temperature, since with an increase in temperature, the record material becomes softer which would produce a deeper groove were it not for the fact that the stiffness of the material is likewise reduced so that the record material will sag into the gap and tend to maintain a groove of constant depth. Since the uppermost position of the rollers 80 is determined by the setting of the slide 106 which defines a stop, where the record material is thicker than the value for which the stop 106 has been set, the rollers 80 will be depressed and move pivotally about the shaft 96 with their yoke 94 against the force of the spring 112 which will serve to bias the rollers 80 into contact with the undersurface of the record so as to maintain its upper surface in contact with the recording stylus 66 so as to emboss a groove of substantially constant depth.

In order to adjust the parts to their operating positions, after the compensator has been assembled in the frame of the machine, the slide or stop 106 is released and a record of desired thickness is interposed between the recording stylus in its operating position and the rollers 80. The slide 114 is then adjusted until the stylus will produce a groove of proper width and depth. The stop 106 is then adjusted until it just clears the projecting end 104 of the yoke operating arm 102.

Frequently, it is desirable to adjust the rollers 80 in their horizontal plane substantially in the path of the recording medium, to compensate for tolerances and variations in the recording stylus and its mounting. This can be accomplished in the manner illustrated in Figs. 8 to 12 inclusive, or otherwise, by producing the compensator frame 72 from two relatively movable parts or frames, the outer frame 76 carrying the flanges 70 as before, which are secured to the table 28, and the relatively movable inner frame 77 whose side walls 79 are received between the side walls 88 of the outer frame, the relative movement of the two frames permitting the rollers to move from a position such as that depicted in Fig. 9 with reference to the stylus 66, to extreme positions such as those depicted in Figs. 11 and 12. Since the reproducing roller 84 carried by the shaft 86, need not be adjustable with respect to its stylus, flanges 81 carried by the outer frame 76 provide journals for the shaft 86, and the set screw 83 is threadedly received by one of these flanges for engagement with a portion of the inner frame 77 to secure it in its desired adjusted position. The yoke 94 is pivoted about its shaft 96 as in the preceding figures, the yoke and rollers 80 in this case being carried by the inner frame 77 which also carries the adjusting slides 106 and 114, the spring 112, and the other parts associated with the adjustment of the biasing force on the rollers and the uppermost limit of their movement towards the stylus. The driving shaft 124 and friction roll 126 are depicted in Fig. 9 in cooperation with a pressure roll 128 which bears on the upper surface of the record 22 when either of the styli is intended to traverse the record.

Figures 9, 11, 12:
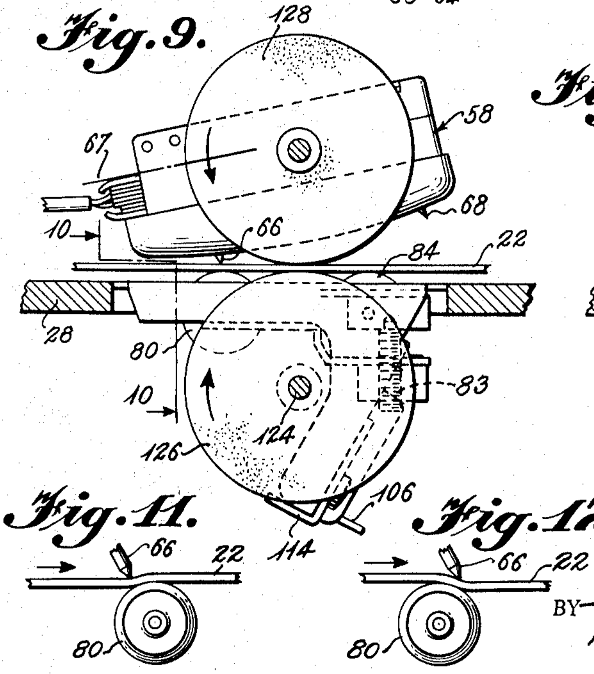
Fig. 9 is an elevation, partially in section, somewhat similar to Fig. 2, depicting the modification of Fig. 8 incorporated in the machine of Fig. 1.
Fig. 11 is a schematic view depicting an adjusted relationship attainable with the modified form of the invention.
Fig. 12 is a schematic view depicting another adjusted relationship of parts attainable with the modification.
Figure 10:
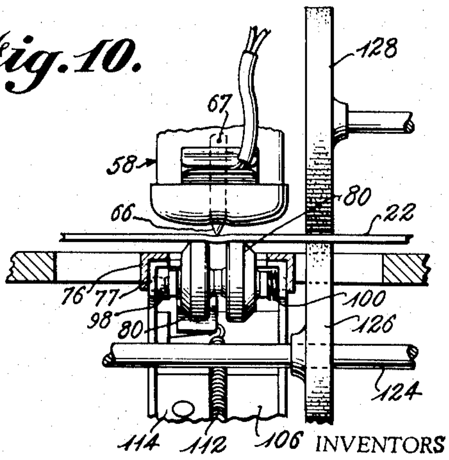
Fig. 10 is an end elevation, partially in section, taken along line 10—10 of Fig. 9.

As illustrated in Figs. 9 and 10, the stylus 66 engages the record 22 in the radial plane of the uppermost portions of the rollers 80. By moving the inner frame 77 to the left as viewed in Fig. 9, the rollers 80 will assume a position relative to the stylus 66 such as that depicted in Fig. 12, whereas moving the inner frame 77 to the right in the outer frame 76 will produce a relative position between the rollers 80 and stylus 66 such as that depicted in Fig. 11. Thus it will be seen, that without changing the angle of the stylus 66 with respect to the frame of the machine, its effective angle will be changed by adjusting the rollers 80 forwardly or rearwardly with respect to the path of the recording medium. In this way, the depth and width of the groove can be varied as effectively as though the angle of the stylus itself were varied, which would be a much more complex adjustment to produce once the components have been assembled.

Since additional variations will occur to those skilled in the art, based upon the invention as shown and described herein, the scope of the invention should not be restricted beyond the terms of the appended claims.

We claim:

1. Recording apparatus comprising a frame, a recording stylus carried by said frame for engagement with one surface of a record, individually rotatable record abutting rollers for engagement with the opposite surface of said record carried by said frame in movable relationship with respect to said stylus, stop means secured to said frame limiting movement of said rollers towards said stylus, and driving means independent of said rollers for advancing a record between said stylus and rollers in a forward direction, said rollers defining a gap opposite said stylus, said gap having a substantially uniform width extending substantially normally to said direction.

2. Recording apparatus comprising a frame, a recording stylus carried by said frame for engagement with one surface of a record, a pair of coaxial individually rotatable record supports for engagement with the opposite surface of said record carried by said frame in movable relationship with respect to said stylus, stop means secured to said frame limiting movement of said supports towards said stylus, and driving means independent of said supports for advancing a record between said stylus and supports in a forward direction, said supports defining a gap opposite said stylus, said gap having a substantially uniform width extending substantially normally to said direction.

3. Recording apparatus as set forth in claim 1 wherein said rollers have an axis lying in a vertical plane common to said stylus.

4. Recording apparatus as set forth in claim 1 wherein said rollers are adjustable relative to said frame.

5. Recording apparatus as set forth in claim 1 wherein biasing means urges said rollers towards said stylus.

6. Recording apparatus as set forth in claim 1 wherein adjusting means for said stop means effect regulating movement of said rollers.

7. Recording apparatus as set forth in claim 1 wherein said record moves in an arcuate path and said gap width extends substantially radially of said path.

8. Recording apparatus as set forth in claim 1 wherein said rollers are supported by a lever pivotally carried in said frame and a spring applied to said lever and frame biases said rollers towards said stylus.

9. Recording apparatus comprising a frame, a recording stylus carried by said frame for engagement with one surface of a disc record, coaxial individually rotatable record supporting rollers for engagement with the opposite surface of said record carried by said frame in movable relationship with respect to said stylus, stop means secured to said frame limiting movement of said rollers towards said stylus, and driving means independent of said rollers for advancing a disc record between said stylus and rollers in an arcuate path, said rollers defining a gap opposite said stylus, said gap having a substantially uniform width extending substantially radially of said path.

10. Recording apparatus comprising a frame, a recording stylus carried by said frame for engagement with one surface of a record, individually rotatable record supporting rollers having cylindrical portions for engagement with the opposite suface of said record carried by said frame in movable relationship with respect to said stylus, stop means secured to said frame limiting movement of said rollers towards said stylus, and driving means independent of said rollers for advancing a record between said stylus and rollers in a forward direction, said rollers defining a gap opposite said stylus, said gap having a substantially uniform width extending substantially normally to said direction, and one of said rollers having a convergent portion adjacent to and coaxial with said cylindrical portion.

11. Recording apparatus comprising a frame, a recording stylus carried by said frame for engagement with one surface of a record, individually rotatable record supporting rollers for engagement with the opposite surface of said record carried by said frame in movable relationship with respect to said stylus, stop means secured to said frame limiting movement of said rollers towards said stylus, driving means for advancing a record between said stylus and rollers in a predetermined path, said rollers defining a gap opposite said stylus, said gap having a substantially uniform width extending substantially normally to said path, and means for adjusting said rollers in substantially the direction of said path.

References Cited in the file of this patent

UNITED STATES PATENTS

| | | |
|---|---|---|
| 502,382 | Randall | Aug. 1, 1893 |
| 1,966,873 | Sochor | July 17, 1934 |
| 2,045,046 | Mudd | June 23, 1936 |
| 2,167,817 | Smith | Aug. 1, 1939 |
| 2,205,058 | Calvert | June 18, 1940 |
| 2,273,391 | Yerkovich | Feb. 17, 1942 |
| 2,296,870 | Proctor | Sept. 29, 1942 |
| 2,296,871 | Proctor | Sept. 29, 1942 |
| 2,391,784 | Johnston | Dec. 25, 1945 |
| 2,460,411 | Calvert | Feb. 1, 1949 |
| 2,487,976 | Kuhlik | Nov. 15, 1949 |